G. W. LIEB.
CONDUIT OR CABLE CLAMP.
APPLICATION FILED APR. 24, 1920.
1,365,629.   Patented Jan. 11, 1921.
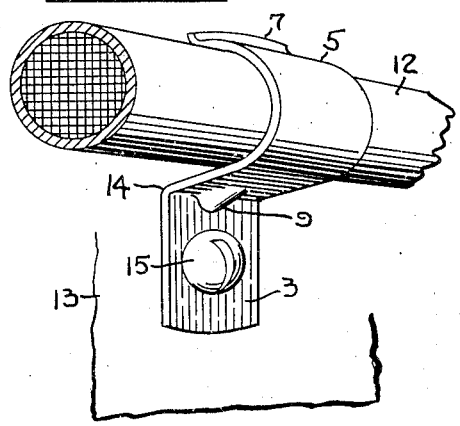
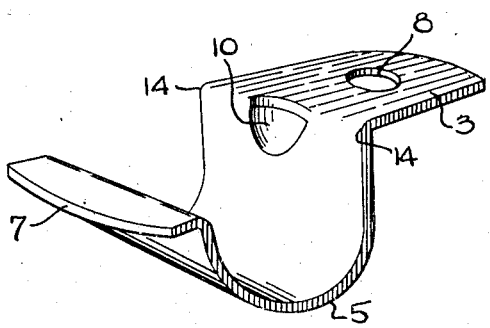
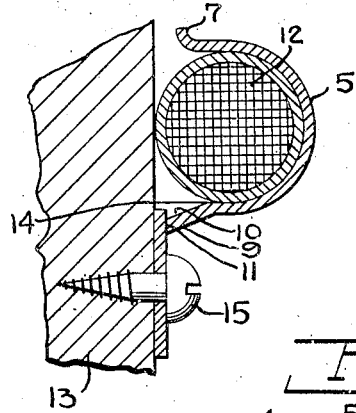
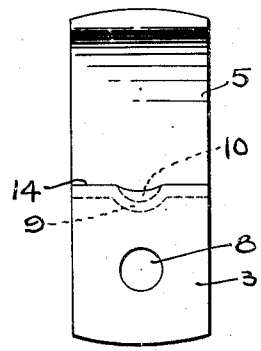
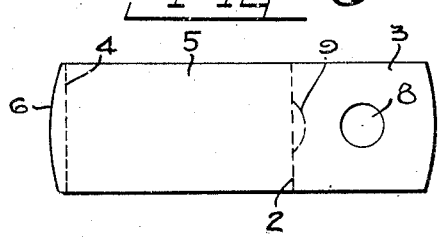

UNITED STATES PATENT OFFICE.

GEORGE WM. LIEB, OF NEWARK, NEW JERSEY, ASSIGNOR TO HENRY B. NEWHALL, JR., OF PLAINFIELD, NEW JERSEY.

CONDUIT OR CABLE CLAMP.

1,365,629. Specification of Letters Patent. Patented Jan. 11, 1921.

Application filed April 24, 1920. Serial No. 376,270.

*To all whom it may concern:*

Be it known that I, GEORGE WILLIAM LIEB, a citizen of the United States, residing in Newark, in the county of Essex and State of New Jersey, have invented certain new and useful Improvements in Conduit or Cable Clamps, of which the following is a specification, taken in connection with the accompanying drawings.

My invention relates to conduit or cable clamps which are used particularly to support cables along the face of walls, fences or other suitable supports, and which while securely holding the cable do not injure or mar it.

My invention further relates to such a cable clamp which can be manufactured at minimum cost, out of comparatively light weight material, yet one which will meet, with a wide margin of safety, all strains and stresses which may be thrown upon it under an abnormal load.

While my conduit or cable clamp is preferably formed out of pressed sheet material, as pressed steel, it may be formed from castings of malleable iron, brass, an alloy, aluminum or any other metal, or it may be made out of pressed fibrous material.

Preferably, though not necessarily, I make my conduit or cable clamp out of a single integral piece of sheet metal of the minimum and same thickness throughout, to reduce the cost of manufacture and the amount of metal used.

My invention further relates to forming a strong and rigid conduit or cable clamp by stamping up a portion of the hook permitting a part of the stamped up portion to bear upon the base and be put under compression to assist in supporting the hook.

My invention further relates to certain details of construction, which will be more fully hereinafter described and pointed out in the claims.

In the figures in which I have shown different embodiments of my invention, the same reference numerals refer to similar parts in the several figures.

Figure 1 is a perspective view showing my improved conduit or cable clamp supporting a cable on a wall or other suitable support;

Fig. 2 is an interior perspective view of my conduit or cable clamp;

Fig. 3 is a vertical section of the conduit or cable clamp shown in Fig. 1;

Fig. 4 is a rear elevation looking into the hook portion of the conduit or cable clamp;

Fig. 5 is a blank from which my conduit or cable clamp is preferably stamped.

It has been the custom of some electrical engineers to use straps encircling the cable with angular ears at each end of the strap provided with holes for the reception of a securing screw. This form is what is known as a two-hole clamp. In using such a clamp in running a cable along a corner formed by a wall and a ceiling or in a corner formed by two walls and a ceiling it is necessary to support the cable at an appreciable distance from the ceiling on account of the angular ears and holes; the distance from the ceiling must be sufficient to not only receive the angular ears but sufficient for the mechanic to work to position the clamp. If it were attempted to change such a two-hole cable clamp to a one hole cable clamp by omitting one of these ears an excessive bending strain would be thrown upon the other ear which could not resist such strains. This would result in the cable falling. To make a one hole cable clamp of sufficient strength to carry such cables it would be necessary to make it of relatively great thickness and weight of metal which would greatly increase the cost and make such a one hole cable clamp more expensive to manufacture than a two hole cable clamp of corresponding strength.

By my invention I employ a one hole clamp which can be set in close to any corner and close to the ceiling at any inter-section of walls and ceilings. I form a one hole clamp of the same, or greater strength, than a two hole clamp previously described and at less cost. I reinforce the weakest portion of the clamp by forming a depression in the hook portion so that a portion of that depression bears upon the base. When the conduit or cable clamp is formed of pressed sheet material this depression is preferably formed by stamping up a portion of the hook.

I will describe my invention as applied to a clamp formed from pressed sheet material, as for example pressed steel, though it is to be understood that it may be otherwise manufactured as previously described.

I take a blank 1, Fig. 5, of any suitable material, and of preferably the same thickness throughout its length, and bend it on the line 2 to form the base 3. That portion of the blank between the line 2 and the line 4 is bent to form the curved hook portion 5 of the complete clamp. The metal in the blank, between the line 4 and the very end 6 is preferably bent up to form the lip 7. Preferably at the same time that the blank is bent to form the hook 5 and the base 3, it is provided with the usual screw hole 8, and with a struck up portion 9, which forms a depression 10 on the interior of the hook member 5. A portion of the metal on the line 2 of the blank is preferably cut or severed to form the arm 11.

In the complete conduit or cable clamp this arm 11 bears upon the exterior surface of the base 3 as shown in Figs. 1 and 3. In supporting the cable 12 on a wall or other suitable support 13, by means of the securing screw 15, great strain is thrown upon the meeting edge 14 of the hook and base portions. In my invention, by providing the depression 10 in the hook member 5 and forming the arm 11, a large portion of the bending strains due to the weight of the cable is transformed into compression stresses thrown upon the arm 11, thereby relieving, to a large extent, the meeting edge 14 from the bending strains due to the weight of the cable, and particularly to abnormal loads due to ice, wind or other atmospheric conditions.

Of course, the relative depth and cross section of the depression 10 and the cross section of the arm 11 may vary as found best suited in practice and for the particular size conduit or cable clamp being manufactured. By my invention I am enabled to make a very cheap conduit or cable clamp formed from one, and the minimum thickness of metal, and a clamp which is very strong and will not bend or break along the meeting edge of the hook and base portions.

Having thus described this invention in connection with an illustrative embodiment thereof, to the details of which I do not desire to be limited, what is claimed as new and what is desired to secure by Letters Patent is set forth in the appended claims.

What I claim is:—

1. A new article of manufacture comprising a conduit or cable clamp formed from one thickness of stamped sheet material, and provided with a hook and a base, the hook having a struck up portion forming a depression on the interior of the hook and an arm, the arm bearing upon the base to form a support for the hook.

2. A new article of manufacture comprising a conduit or cable clamp formed from pressed sheet material having a hook portion to receive and hold a cable and a base to lie against a wall or other suitable support, the hook portion being provided with a reinforcing member cut from said hook and adapted to bear on the base to transmit some of the strains on the hook directly to the base.

GEORGE WM. LIEB.

Witnesses:
J. M. HIGHLAND,
M. ROTHBORNE.